J. W. PRENTISS.
Purifying Butter.
No. 25,672. Patented Oct. 4, 1859.
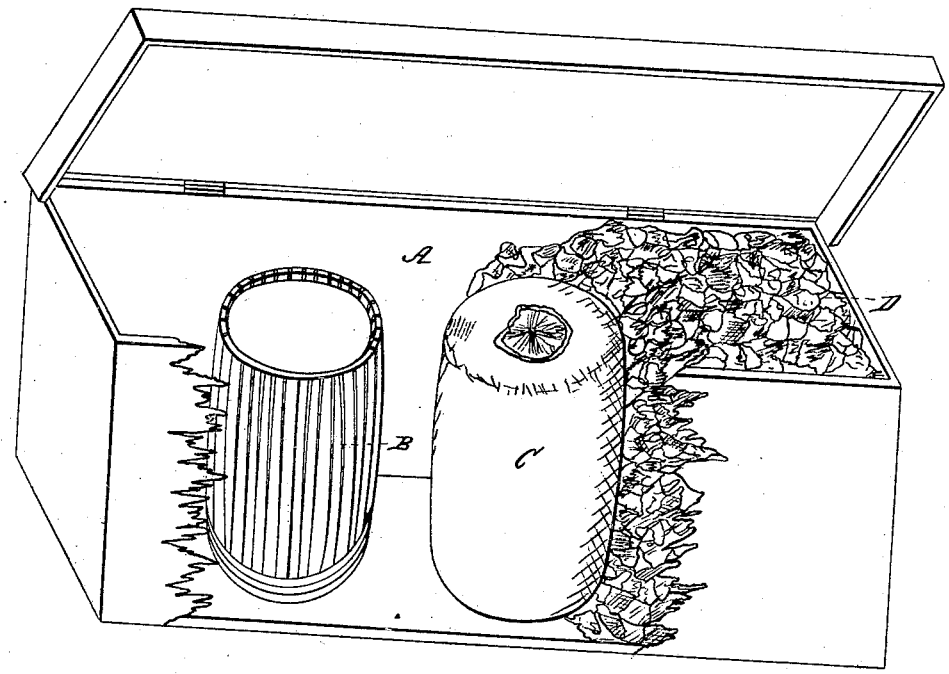
Witnesses:
Inventor:

UNITED STATES PATENT OFFICE.

JOSIAH W. PRENTISS, OF PULTNEY, NEW YORK.

MODE OF RESTORING RANCID BUTTER.

Specification of Letters Patent No. 25,672, dated October 4, 1859.

*To all whom it may concern:*

Be it known that I, JOSIAH W. PRENTISS, of Pultney, in the county of Steuben and State of New York, have invented a Method of Restoring Rancid Butter in the Firkin, which I have described in the following specification and illustrated in its accompanying drawings with sufficient clearness to enable competent and skilful workmen in the arts to which it pertains or is most nearly allied to make and use my invention.

My said invention consists in the mode hereinafter described, of employing the well known disinfectant qualities of charcoal in restoring rancid butter without removing the butter from the firkin; which I accomplish by first removing one of the heads and all of the hoops except just enough of the lower ones to hold the remaining head, inclosing the firkin thus prepared in a sack of a texture sufficiently close to prevent the passage of broken charcoal, and surrounding the firkin so prepared and inclosed with broken charcoal, as hereinafter more fully set forth.

The devices which I employ in carrying my invention into practice are represented in the accompanying drawings in perspective, the front of the box being broken away to allow the representation of the interior parts.

A is a box or bin for containing charcoal, which box may be made of any form and size that may be required to suit the circumstances of the case and to contain the necessary amount of this disinfectant to accomplish the purpose to be realized.

B is the keg or firkin in which the butter is contained, supposed to be of the form and size usually employed in packing butter for market. As represented, all the hoops except two or three of the bottom ones are removed, and also the upper head of the firkin, to open the joints of the firkin and allow the disinfectant properties of the charcoal to act upon the butter without removing the butter from the firkin, and by so opening the keg, the space around the butter is sufficiently opened for this purpose, and the necessary atmospheric circulation is provided for. Having thus prepared the firkin, I then inclose it in a sack or bag C, which may be made of any common material used for making bags. It should however be sufficiently open in its texture to allow the gases to circulate, without being so much so as to allow the charcoal to come in contact with the butter. The mouth of the bag having been carefully closed, I place the firkin in the box A, fill the space around it with broken charcoal, and having carefully closed the box, allow the whole to remain undisturbed for about eight days, in which time I find by practice that the charcoal will usually absorb from the butter the impure acids and gases from which its unpleasant taste and the disagreeable effluvia proceed. In extreme cases and under certain circumstances a longer time may be required, while under more favorable conditions, and where the butter is but little changed, a less time may very often be quite sufficient for the purpose. It is well known that butter in the firkin frequently from some fault in the firkin or other cause becomes slightly damaged upon the outside while the interior of the mass retains nearly or quite its primitive sweetness, and the restoration of the outer strata is all that is required. By this arrangement this is accomplished without removing the butter from the firkin, which is a very great advantage, for the less butter can be handled after once packed till it is used the better, and besides, the saving of handling avoids expense. It is further to be considered that the unpacking and re-packing of butter has a tendency to injure its appearance even if it did no other harm, and spoils its sale in the market.

It is well known that charcoal is a disinfectant, and I make no claim to its use for purifying purposes.

The object and purpose of my invention is to purify rancid butter in the keg or firkin, and it is to the mode described of accomplishing this purpose that my invention is strictly confined. I am aware however that there may be slight variations in the process, which, not being in any respect material, do not change the invention, which my improvement would of course include, as for example the use of a sheet or other cloth in place of the sack which I generally employ.

The particular improvement which I claim as having been originally and first invented by me, is—

The mode described of restoring rancid butter in the firkin by removing the hoops so as to open the joints, inclosing it in a bag or other textile fabric, and then surrounding the whole with charcoal, substantially as hereinbefore described and for the purpose set forth.

J. W. PRENTISS.

Witnesses:
JAMES F. GRIDLEY,
H. W. BOARDMAN.